United States Patent
Rietzler et al.

(10) Patent No.: US 8,505,825 B2
(45) Date of Patent: Aug. 13, 2013

(54) LAYERED COMPOSITE FOR A CARD BODY AND METHOD FOR PRODUCING THE LAYERED COMPOSITE

(75) Inventors: Manfred Rietzler, Marktoberdorf (DE); Raymond Freeman, Mesa, AZ (US)

(73) Assignee: Smartrac IP B. V., Amsterdam (NL)

( * ) Notice: Subject to any disclaimer, the term of this patent is extended or adjusted under 35 U.S.C. 154(b) by 172 days.

(21) Appl. No.: 12/921,673

(22) PCT Filed: Mar. 13, 2009

(86) PCT No.: PCT/EP2009/001809
§ 371 (c)(1),
(2), (4) Date: Sep. 9, 2010

(87) PCT Pub. No.: WO2009/115233
PCT Pub. Date: Sep. 24, 2009

(65) Prior Publication Data
US 2011/0024511 A1 Feb. 3, 2011

(30) Foreign Application Priority Data
Mar. 18, 2008 (DE) .......... 10 2008 014 687

(51) Int. Cl.
*G06K 19/02* (2006.01)
(52) U.S. Cl.
USPC .......................................... 235/488; 235/492
(58) Field of Classification Search
USPC ................ 235/487, 488, 492; 428/201–220
See application file for complete search history.

(56) References Cited

U.S. PATENT DOCUMENTS

| 5,055,345 | A | 10/1991 | Wank et al. | |
|---|---|---|---|---|
| 7,278,580 | B2 * | 10/2007 | Jones et al. | 235/488 |
| 2006/0141227 | A1 * | 6/2006 | Sudo et al. | 428/212 |
| 2007/0237932 | A1 * | 10/2007 | Shvartsman | 428/204 |

FOREIGN PATENT DOCUMENTS

| DE | 36 35 526 C1 | 1/1988 |
|---|---|---|
| DE | 39 39 864 A1 | 6/1991 |
| DE | 196 17 621 A1 | 11/1997 |
| DE | 697 19 383 T2 | 2/2003 |
| EP | 0 384 252 A | 8/1990 |
| EP | 0 430 282 A | 6/1991 |
| EP | 1 380 442 A | 1/2004 |
| EP | 1 842 689 A2 | 10/2007 |

OTHER PUBLICATIONS

International Search Report under date of Jun. 16, 2009 in connection with PCT/EP2009/001809.
Translation of the International Preliminary Report on Patentability, Application No. PCT/EP2009/001809, Oct. 14, 2010.

\* cited by examiner

*Primary Examiner* — Christle Marshall
(74) *Attorney, Agent, or Firm* — Quarles & Brady LLP

(57) ABSTRACT

The present invention relates to a layered composite (10) for producing a card body comprising a chip module (12) for a chip card, having a substrate layer arrangement (11) for arranging the chip module, and having intermediate layers (18, 19) disposed on both sides of the substrate layer arrangement, each having a cover layer (21, 22), wherein the substrate layer arrangement and the cover layers are designed in relation to the intermediate layers such that the substrate layer arrangement and the cover layers are formed as layers having a relatively rigid shape and hard surfaces, and the intermediate layers are formed as layers having a relatively elastic shape and soft surfaces, and also relates to a method for producing a layered composite.

14 Claims, 2 Drawing Sheets

LAYERED COMPOSITE FOR A CARD BODY AND METHOD FOR PRODUCING THE LAYERED COMPOSITE

CROSS-REFERENCE TO RELATED APPLICATIONS

This application claims priority to PCT International Application No. PCT/EP2009/001809 filed on Mar. 13, 2009, which claims the benefit of German Patent Application No. 10 2008 014 687.0 filed Mar. 18, 2008, both of which are incorporated herein by reference.

The present invention relates to a layered composite for producing a card body comprising a chip module for a chip card, having a substrate layer arrangement for arranging the chip module, and having intermediate layers disposed on both sides of the substrate layer arrangement, each having a cover layer, wherein the substrate layer arrangement and the cover layers are designed in relation to the intermediate layers such that the substrate layer arrangement and the cover layers are designed as layers having a relatively rigid shape and hard surfaces, and the intermediate layers are designed as layers having a relatively elastic shape and soft surfaces. Moreover, the invention relates to a base layer arrangement according to claim 10 and a method for producing such a layered composite according to claim 11, 13 or 14.

Chip cards which feature a chip module integrated into the card body are known in a large variety of different embodiments. In this regard, a differentiation can basically be made between so-called "contact" cards, which, in the card surface thereof, have a terminal face arrangement for contact-based access to the data stored in the chip module, and so-called "contactless" cards, frequently also referred to as smart cards, enabling contactless access and contactless data transfer between a reading device and the chip module via an antenna device contacted with the chip module and equally disposed within the card body.

Irrespective of the configuration of the chip card either in the form of a "contact" card or a "contactless" card, the chip module is arranged on a substrate regularly formed within the card body in the form of a so-called substrate layer and being designed so as to be relatively rigid in terms of flexure in order to provide the chip card with the degree of flexural rigidity necessary for utilization, making it for instance possible to keep chip cards in a wallet which is carried along by the user in a trouser pocket, where the chip cards are sometimes subjected to extreme bending stresses.

Though the known cards are thus regularly designed with a very high degree of robustness and with a substrate layer or a substrate layer arrangement that is designed so as to be dimensionally rigid and is made of a cross-linked plastic material, such as a polycarbonate, in order to realize the required degree of flexural rigidity, as a result of using the cards sometimes over long periods of time and thereby to some extent involving exposure to dynamical bending stresses, cracks are formed in the substrate material, which are generally the result of a notching effect acting on the surface of the substrate layer and emanating from the periphery of the chip module, which has a comparatively higher degree of flexural rigidity compared to the substrate layer.

Though such crack formation in the substrate layer regularly does not have a bearing on the function of the chip module, cards having cracks formed in the substrate layer have hitherto been required to be replaced, since in the known card types, crack formation emanating from the substrate layer in general propagates through the card body into the card surface, where crack formation impairs smooth functioning of the outer terminal face arrangement or readability of an outer magnetic strip or an embossing commonly provided on credit cards or simply only of a visual imprint or visual mark.

Correspondingly, durability or usability of chip cards is impaired or reduced due to the formation of cracks which propagate into the card surface.

Thus, it is an object of the present invention to suggest a layered composite and a base layer arrangement for a card body and a method for producing a layered composite so as to enable the production of a card body having a surface that is not damaged due to crack formation in the substrate layer.

This object is attained by a layer structure having the features of claims 1 or 10 and a method having the features of claim 11, 13 or 14.

The inventive layered composite has intermediate layers disposed on both sides of the substrate layer arrangement and each being furnished with a cover layer, wherein the substrate layer arrangement and the cover layers are designed in relation to the intermediate layers such that the substrate layer arrangement and the cover layers are designed as layers having a relatively rigid shape and hard surfaces, and the intermediate layers are designed as layers having a relatively elastic shape and soft surfaces.

Due to the two-sided arrangement of the dimensionally elastic intermediate layers on the substrate layer arrangement it is prevented that the formation of cracks emanating from the substrate layer arrangement, which is designed so as to have a relatively rigid shape, propagates through the intermediate layers into the cover layers equally designed so as to feature a relatively rigid shape. The intermediate layers, due to the dimensionally elastic structure thereof, substantially act as a barrier layer for the cracks. In particular, the dimensionally elastic structure makes it possible that shearing stresses induced in the intermediate layer as a result of crack formation in the substrate layer can be dissipated in the intermediate layer itself, so as to prevent propagation of the same into the cover layer. Comparable to the substrate layer, the cover layer itself is designed so as to have a relatively rigid shape in order to produce a hard, abrasion-resistant and scratch-resistant surface, as is required for utilization of a chip card.

The inventive layered composite and the inventive base layer arrangement are particularly suited for the production of contactless cards, since, due to the arrangement of the antenna device onto or within the substrate layer arrangement and for limiting mechanical stresses exerted on the connection between the antenna device and the chip module, special importance is attributed to the flexurally rigid configuration of the substrate layer arrangement. However, the rigidity of the substrate layer arrangement simultaneously involves an increased risk of crack formation.

A substantially symmetrical layer structure is enabled if the substrate layer arrangement features two substrate layers receiving the chip module therebetween and being covered by the intermediate layers and having outer substrate surfaces disposed so as to be plane-parallel with respect to one another. By means of the plane-parallel outer substrate surfaces, transitional areas to the intermediate layers are formed in conformity with both sides of the substrate layer arrangement, ensuring that the shearing stresses induced in the intermediate layer due to crack formation in the substrate layer arrangement can be uniformly dissipated at both sides of the substrate layer arrangement irrespective of the bending direction into which the card body is subjected to stresses. Moreover, the intermediately arranged chip module enables accommodation of the chip module such that special protection against external stresses is provided.

In order to be able to furnish the card body with an optical identification mark visible from the outside, for instance a letter mark or a hologram, it is advantageous if at least one cover layer and the adjacent intermediate layer are designed so as to be transparent and if at least one laser-radiation absorbing layer is disposed between the substrate layer facing the transparent cover layer and the intermediate layer. At the same time, it can be ensured by this measure that the optical identification mark is not accessible from the outside and thus cannot be modified or else destroyed.

Alternatively, it is possible to form at least one cover layer so as to be transparent to permit application of an optical identification mark onto or within the card body in a manner visible from the outside and to arrange at least one absorbing layer between the cover layer and the adjacent intermediate layer.

It goes without saying that it is also possible to directly furnish an intermediate layer formed below the transparent cover layer with an imprint.

Irrespective of the arrangement of the absorbing layer in the card body, the absorbing layer may be designed as an actually separately manipulable layer that is situated within the layer structure at the desired position, or the absorbing layer may also be designed as a coating applied onto the surface of an adjacent layer.

If a coating made of an adhesive material or a layer formed of an adhesive material is provided between the substrate layer arrangement and the intermediate layers, it is possible to produce the laminated connection between the substrate layer arrangement and the intermediate layers in the form of a cold-formed connection, i.e. without exposure to high temperatures as performed in conventional hot lamination processes. This cold-formed connection or cold lamination can be performed at room temperature as a function of the texture of the adhesive material. By means of this measure, it is possible to prevent undesired temperature stresses exerted on the chip module during production of the layer structure.

Alternatively or additionally to the adhesively bonded connection between the substrate layer arrangement and the adjacent intermediate layers, it is possible to provide a coating made of an adhesive material or a layer formed of an adhesive material between the intermediate layers and the cover layers in order to be able to advantageously perform cold lamination also in this case.

Combining a polycarbonate for the substrate layer arrangement with a polyolefin for the intermediate layers has proven to be particularly advantageous for the production of a layered composite.

For the cover layers, the same material as that used for the substrate layer arrangement can be advantageously utilized as well, i.e. for instance a polycarbonate.

The inventive base layer arrangement on the one hand can be advantageously utilized for the production of a layered composite. On the other hand, the inventive base layer arrangement constitutes a minimal configuration of the layered composite for producing a chip card, wherein the intermediate layers form outer layers with omission of the cover layers. In particular in the case of a surface of the intermediate layers/outer layers that is printable or else is furnished with an imprint, the production of a low-cost embodiment of a chip card is thus possible, the chip card only comprising the substrate layer arrangement having the intermediate layers/outer layers disposed thereon and having surfaces that are directly formed by the intermediate layers and outer layers respectively.

The inventive methods have the features of claim 11, 13 or 14.

According to the invention, in a first method alternative for producing a layered composite for a card body comprising at least one chip module on both sides of a substrate layer arrangement furnished with the chip module and made of a plastic material having a relatively rigid shape, the arrangement of at least one intermediate layer made of a plastic material having a relatively elastic shape is performed. Upon arrangement of at least one cover layer made of a plastic material having a relatively rigid shape on the intermediate layers, the layer structure is then exposed to pressure and heat for producing a laminate structure.

The afore-described inventive method alternative enables the production of the layer structure in a connection process, wherein all layers are connected without the use of additional connecting materials.

The substrate layer arrangement may be advantageously formed in a preceding method step, in particular in a lamination process.

According to a second inventive method alternative, for producing a layered composite for a card body comprising at least one chip module on both sides of a substrate layer arrangement furnished with the chip module and made of a plastic material having a relatively rigid shape, arrangement of at least one intermediate layer made of a plastic material having a relatively elastic shape is performed. For producing a laminate structure, the arrangement comprising the substrate layer arrangement having the intermediate layers disposed thereon is exposed to pressure and heat. Subsequently, a cover layer made of a plastic material having a relatively rigid shape is applied to the intermediate layers, with a coating or a layer made of an adhesive material being arranged intermediately.

The aforedescribed method alternative makes it possible to produce a partially layered composite comprising the substrate layer arrangement and the adjacent intermediate layers in a lamination process without the use of additional connection means and, by additionally providing the partially layered composite with the cover layers by means of an adhesively bonded connection, to ensure that even in case of extremely thinly configured cover layers, warpage occurring in the surface of the card body can be largely precluded due to the absence of temperature stresses during production of the adhesively bonded connection so as to be thus able to produce a nearly perfectly even card body.

According to the third inventive method alternative, for producing a layered composite for a card body comprising at least one chip module on both sides of a substrate layer arrangement furnished with the chip module and made of a plastic material having a relatively rigid shape, with a coating made of an adhesive material or a layer formed of an adhesive material being arranged intermediately, at least one intermediate layer made of a plastic material having a relatively elastic shape is applied. Subsequently, a cover layer made of a plastic material having a relatively rigid shape is applied to the intermediate layers, with a coating made of an adhesive material or a layer formed of an adhesive material being arranged intermediately.

The afore-described method thus enables the production of the entire layer structure in the absence of the temperature stresses occurring in connection with a conventional lamination process.

In the following, preferred embodiments of the layered composite for producing a card body for a chip card will be described in more detail by describing the methods employed in this process.

Figure 1:
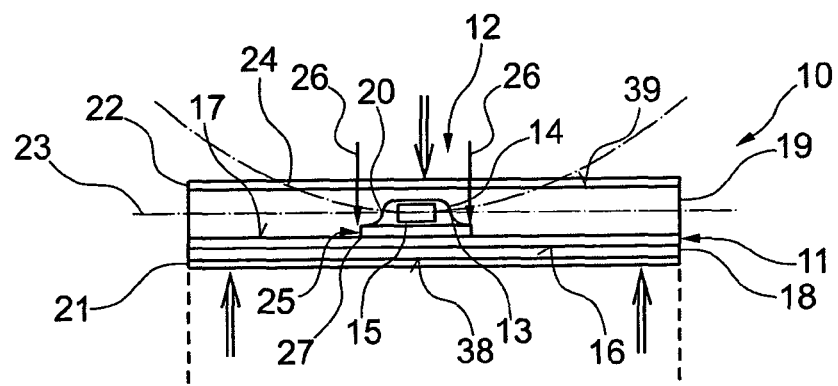
FIG. 1 shows a layered composite for producing a card body according to a first embodiment.

FIG. 1 shows a layered composite 10 which has a substrate layer arrangement 11 being in the present case formed of only one substrate layer and having a chip module 12 arranged thereon. The chip module 12 features a chip carrier 13 formed so as to be flexurally rigid and having a chip 15 disposed in a module housing 14 arranged thereon. The substrate layer, which in the present case forms the substrate layer arrangement 11, is composed of a dimensionally rigid plastic material, such as polycarbonate, polypropylene, PET or a polyimide, and on the lower side 16 and the upper side 17 thereof is respectively furnished with an intermediate layer 18, 19 made of a dimensionally elastic, preferably porous material, such as a foamed polyethylene. For producing paper-like characteristics, the material of the intermediate layers 18, 19 may be furnished with a silicon dioxide as a filler, so that for instance direct printing or marking of the intermediate layer surfaces can be performed. In the present case, the intermediate layers 18, 19 are designed so as to feature different thicknesses, since the intermediate layer 19 is furnished with a recess 20 for receiving the chip module 12. The outer surfaces 38, 39 of the intermediate layers 18, 19 directed towards the outside are each provided with a cover layer 21, 22, which is formed of a dimensionally rigid plastic material corresponding to the material of the substrate layer arrangement 11.

In the illustration depicted in FIG. 1 of the layered composite 10, the relation of forces is schematically indicated, giving rise to bending of the layered composite 10 with the result that—as schematically illustrated by the deflection of a center line 23—bending of the layered composite 10 about a bending axis 24 intersecting the center line 23 is caused.

As is clearly evident, due to the different degrees of flexural rigidity of the substrate layer arrangement 11 and the chip module 12, respectively the chip carrier 13, pressure peaks 26 are produced along cross-sectional transitions 25 from the chip carrier 13 to the substrate layer arrangement 11. These pressure peaks 26 give rise to a notching effect that may cause formation of cracks 27, as schematically illustrated in FIG. 1, in the substrate layer and the substrate layer arrangement 11, respectively, in particular due to dynamical bending stresses. As a result of the formation of the intermediate layer 18 made of a dimensionally elastic plastic material it is rendered possible that warpage or delaminations occurring in the originally even topography of the lower side 16 and caused due to cracks 17 on the lower side 16 of the substrate layer arrangement 11 are absorbed by means of elastic displacements in the structure of the intermediate layer 18 without causing the cracks to propagate through the intermediate layer to an outer surface 38 of the intermediate layer adjacent to a cover layer 21. Hence, the even topography of the cover layer 21 is not subjected to any impairments, such that a formation of cracks 27 in the substrate layer arrangement 11 is not discernible as a consequence of the intermediate layer 18 disposed at the cover layer 21. Thus, the intermediate layer 18 substantially acts as a barrier to crack propagation.

For the purpose of simplified representation, in the exemplary embodiments illustrated in FIG. 1 and in the further drawings, the respectively illustrated layered composite is furnished with only one chip module 12 disposed within the layered composite, without establishing a contact to a terminal face arrangement disposed on the outer surface of the cover layers for contact-based access in the case of a layered composite configuration specific for a contact chip card. Likewise for the purpose of simplified representation, the variant of a contactless chip card is not illustrated either, wherein the chip module 12 is contacted with an antenna device disposed within the layered composite and, like the chip module 12, may be situated on or within the substrate layer arrangement. The previously described advantageous effects produced by the intermediate layers can be realized in the case of both contact cards and contactless cards.

Figure 2:
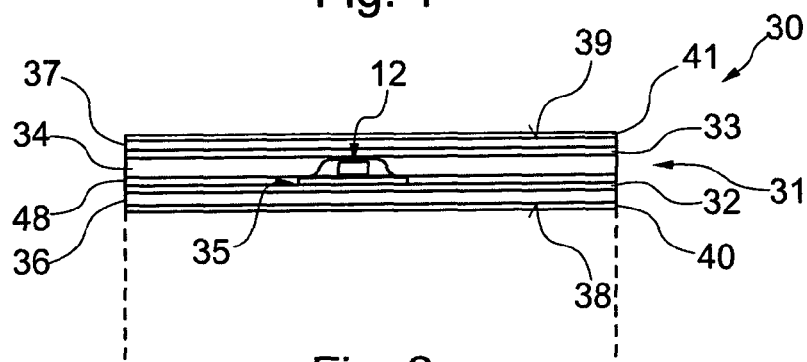
FIG. 2 shows a layered composite for producing a card body according to a second embodiment.

FIG. 2 shows a layered composite 30 that, in contrast to the layered composite 10 illustrated in FIG. 1, features a substrate layer arrangement 31, which, in addition to a first substrate layer 32 having the chip module 12 disposed thereon, has s second substrate layer 33, which in the present case, in analogy with the substrate layer 32, is formed of a dimensionally rigid plastic material, wherein the two substrate layers 32, 33 receive the chip module 12 therebetween. Between the substrate layers 32, 33, in the present exemplary embodiment, compensating layers 34, 48 jointly forming a recess 35 are disposed for receiving the chip module 12 and may be formed of the same material as that of the intermediate layers 36, 37 adjacently arranged to the substrate layers 32, 33. The intermediate layers 36, 37, like the intermediate layers 18, 19 in the layered composite 10 illustrated in FIG. 1, are composed of a dimensionally elastic plastic material and on the outer surfaces 38, 39 thereof are furnished with cover layers 40, 41. The substrate layer arrangement 31 of the layered composite illustrated in FIG. 2, in contrast to the layered composite 10 illustrated in FIG. 1, enables a symmetrical layer structure on both sides of the substrate layer arrangement 31, such that the layered composite 30 has a bending characteristic independent of the bending direction.

Figure 3:
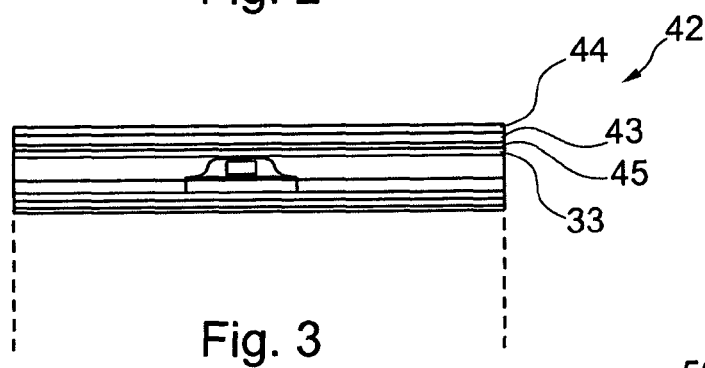
FIG. 3 shows a layered composite for producing a card body according to a third embodiment.

FIG. 3 shows a layered composite 42 largely corresponding to the layered composite 30 illustrated in FIG. 2 and thus having the same reference signs. In contrast to the layered composite 30 illustrated in FIG. 2, in the layered composite 42 illustrated in FIG. 3, provision is made for a transparent intermediate layer 33 and a transparent cover layer 44 above the upper substrate layer 33 of the substrate layer arrangement 31. Between the upper substrate layer 33 and the transparent intermediate layer 43 provision is made for an absorbing layer 45 which is formed so as to absorb laser radiation to permit the production of imprints in the absorbing layer 45.

Figure 4:
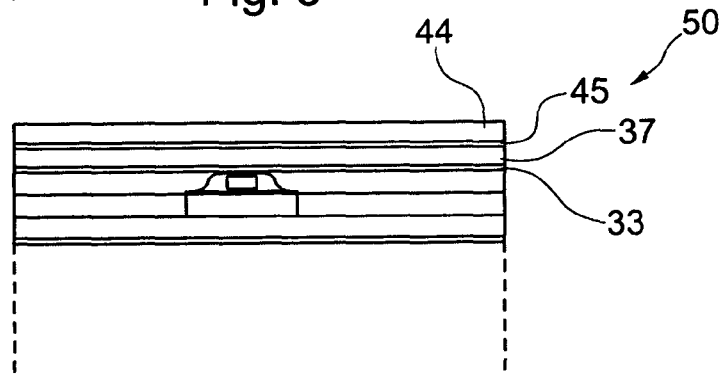
FIG. 4 shows a layered composite for producing a card body according to a fourth embodiment.

FIG. 4 shows a layered composite 50 that, in contrast to the layered composite 30 illustrated in FIG. 2, has a transparently designed upper cover layer 44 and an absorbing layer 45 disposed between the upper intermediate layer 37 and the transparent cover layer 44.

Figure 5:
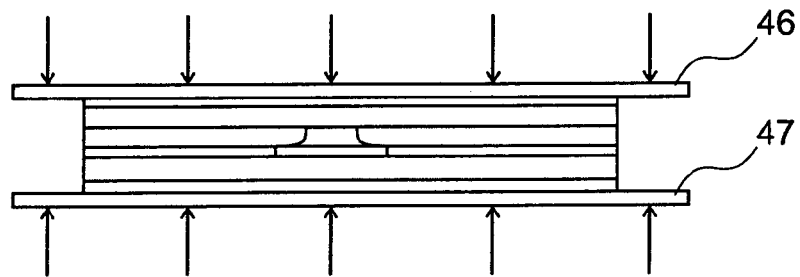
FIG. 5 shows a partially layered composite for producing the layered composite illustrated in FIG. 2 with exposed intermediate layers.
Figure 6:
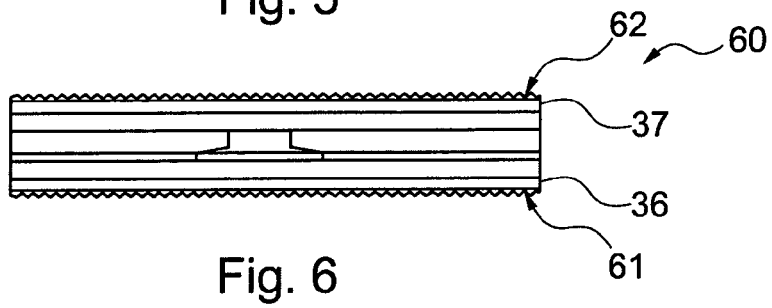
FIG. 6 shows the partially layered composite illustrated in FIG. 5 with an adhesive material coating applied to the intermediate layers.
Figure 7:
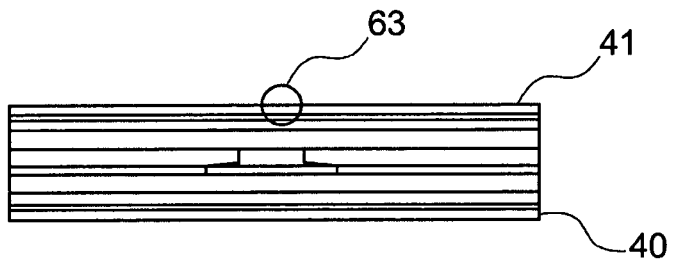
FIG. 7 shows the partially layered composite illustrated in FIG. 6 with cover layers additionally applied to the intermediate layers for finishing the layered composite illustrated in FIG. 2.

In FIGS. 5 to 7, in the following two possible alternatives for producing the layered composite 30 illustrated in FIG. 2 are presented.

As illustrated in FIG. 5, one option for producing the layered composite 30 can be seen in arranging the layers forming the substrate layer arrangement 31, i.e. here the substrate layers 32, 33 having the compensating layers 34, 48, the intermediate layers 36, 37 and the cover layers 40, 41 disposed on the intermediate layers in the illustrated order so as to be disposed on top of one another, and to connect the same with one another in a single subsequent lamination step through exposure to pressure and heat by heatable pressure plates 46, 47, as indicated in FIG. 5, in order to produce the layered composite 30.

As shown in FIGS. 6 and 7, there is also the option to initially produce a partially layered composite 60 comprising the substrate layer arrangement 31 and the intermediate layers 36, 37 disposed on both sides of the substrate layer arrangement 31. The partially layered composite 60 can be produced in a lamination process in analogy with the production of the layered composite 30 illustrated in FIG. 5.

Starting from the finished partially layered composite 60, a coating 61, 62 made of an adhesive material can now be applied to the outer surfaces 38, 39 of the intermediate layers 36, 37 for producing the layered composite 30.

As shown in FIG. 7, the cover layers 40, 41 are subsequently disposed on the partially layered composite 60 furnished with the coatings 61, 62, wherein for supporting the production of a connection between the cover layers 40, 41 and the intermediate layers 36, 37, the cover layers 40, 41 can be exposed to pressure.

Figure 8:
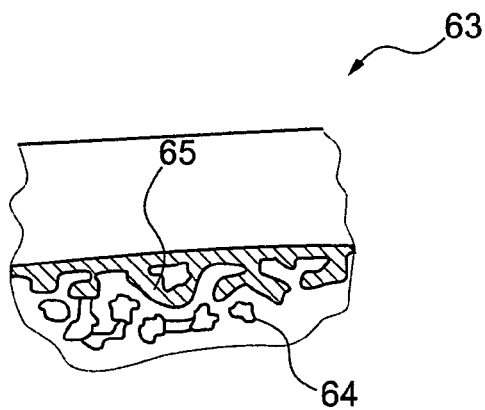
FIG. 8 shows an enlarged partial view of the connection area illustrated in FIG. 7 between the intermediate layer and the cover layer disposed thereon.

FIG. 8 shows the formation of the adhesively bonded connection in a connection area 63 between the cover layer 41 and the adjacent intermediate layer 37. In case the intermediate layer 37 is formed so as to be porous, the adhesive material penetrates into cavities 64 of the intermediate layer 37, which are formed as a result of porosity and are partly connected with one another, and produces bracket-like adhesive bridges 65 in the material of the intermediate layer 37. As a result, special coupling of the cover layer 41 with the intermediate layer 37 is realized, permitting separation of the cover layer 41 only upon application of massive destructive forces onto the intermediate layer and thus in a clearly visible fashion. By means of this aspect, significant enhancement of falsification safety of the layered composite can be realized.

The invention claimed is:

1. A layered composite for producing a card body, said composite comprising:
a chip module for a chip card, having a substrate layer arrangement for arranging the chip module,
intermediate layers disposed on opposing sides of the substrate layer arrangement, each having a cover layer, wherein the substrate layer arrangement and the cover layers are designed in relation to the intermediate layers such that the substrate layer arrangement and the cover layers are layers having a substantially rigid shape and hard surfaces, and the intermediate layers are layers having a substantially elastic shape and soft surfaces, wherein at least one cover layer and an adjacent intermediate layer are substantially transparent and a laser-radiation absorbing layer is disposed between the substrate layer arrangement facing towards the transparent cover layer and the intermediate layer.

2. The layered composite according to claim 1, in which the substrate layer arrangement features two substrate layers receiving the chip module therebetween and being covered by the intermediate layers and having outer substrate surfaces disposed so as to be plane-parallel with respect to one another.

3. The layered composite according to claim 1, in which the adjacent intermediate layer is furnished with an imprint on the surface thereof facing towards the transparent cover layer.

4. The layered composite according to claim 1, in which a coating made of an adhesive material is provided between the substrate layer arrangement and the intermediate layers.

5. The layered composite according to claim 4, in which a coating made of an adhesive material is provided between the intermediate layers and the cover layers.

6. The layered composite according to claim 1, in which the substrate layer arrangement is made of a polycarbonate and the intermediate layers are made of a polyolefin.

7. The layered composite according to claim 1, in which the cover layers are made of a polycarbonate.

8. A base layer arrangement, in particular for producing a layered composite according to claim 1, having a substrate layer arrangement for arranging the chip module, and outer layers disposed on opposing sides of the substrate layer arrangement, wherein the substrate layer arrangement is designed in relation to the outer layers such that the substrate layer arrangement has a substantially rigid shape and hard surfaces, and the outer layers are layers having a substantially elastic shape and soft surfaces.

9. A method for producing a layered composite for a card body comprising at least one chip module for a chip card, wherein a substrate layer arrangement furnished with the chip module and made of a plastic material having a substantially rigid shape, on opposing sides thereof is respectively provided with at least one intermediate layer made of a plastic material having a substantially elastic shape, said method comprising:
upon arrangement of at least one cover layer made of a plastic material having a substantially rigid shape on the intermediate layers, exposing said at least one cover layer to pressure and heat for producing a laminate structure, wherein the at least one cover layer and an adjacent intermediate layer are substantially transparent and a laser-radiation absorbing layer is disposed between the substrate layer arrangement facing towards the transparent cover layer and the intermediate layer.

10. The method according to claim 9, in which in a preceding method step, production of the substrate layer arrangement composed of a plurality of substrate layers is performed.

11. The method according to claim 10, in which production of the substrate layer arrangement is performed with the chip module being arranged intermediately.

12. The method according to claim 10, in which the substrate layers of the substrate layer arrangement for producing a laminate structure are exposed to pressure and heat.

13. A method for producing a layered composite for a card body comprising at least one chip module for a chip card, wherein a substrate layer arrangement furnished with the chip module and made of a plastic material having a substantially rigid shape, on opposing sides thereof is furnished with respectively one intermediate layer made of a plastic material having a substantially elastic shape, said method comprising:
exposing said at least one intermediate layer to pressure and heat for producing the laminate structure; and
applying a cover layer made of a plastic material having a substantially rigid shape to the intermediate layers with a coating made of an adhesive material being arranged intermediately, wherein at least one cover layer and an adjacent intermediate layer are substantially transparent and a laser-radiation absorbing layer is disposed between the substrate layer arrangement facing towards the transparent cover layer and the intermediate layer.

14. A method for producing a layered composite for a card body comprising at least one chip module for a chip card, wherein at least one intermediate layer made of a plastic material having a substantially elastic shape is applied to opposing sides of a substrate layer arrangement furnished with the chip module and made of a plastic material having a substantially rigid shape, with a coating made of an adhesive material being arranged intermediately, said method comprising:

applying a cover layer made of a plastic material having a substantially rigid shape is subsequently applied to the intermediate layers, with a coating made of an adhesive material being arranged intermediately, wherein at least one cover layer and an adjacent intermediate layer are substantially transparent and a laser-radiation absorbing layer is disposed between the substrate layer arrangement facing towards the transparent cover layer and the intermediate layer.

\* \* \* \* \*